United States Patent
Maniaci et al.

[15] 3,693,486
[45] Sept. 26, 1972

[54] CONVEYOR SYSTEM

[72] Inventors: Philip J. Maniaci, West Covina; Byron E. McKinsey, Montebello, both of Calif.

[73] Assignee: Arcata Graphics, Los Angeles, Calif.

[22] Filed: March 3, 1971

[21] Appl. No.: 120,559

[52] U.S. Cl. ..........................83/88, 83/107, 83/27, 83/925 A, 198/32
[51] Int. Cl. .................................................B26d 7/06
[58] Field of Search....83/88, 27, 89, 94, 107, 925 A; 198/32

[56] References Cited

UNITED STATES PATENTS

| R21,718 | 2/1941 | McFarland et al. | 88/107 |
| 3,207,017 | 9/1965 | McCain | 83/27 |
| 3,339,701 | 9/1967 | Weichhand | 198/32 |

*Primary Examiner*—Donald R. Schran
*Attorney*—Smyth, Roston & Pavitt

[57] ABSTRACT

Books are printed in units each comprising two integral books positioned edge to edge and the units are bisected at a shearing station to produce single books on each side of the shearing station. The sheared books from one side of the shearing station are conveyed in a first traveling row with spaces between the successive books and the other books are conveyed in a second traveling row that merges with the first traveling row at the spaces thereof to form a combined row of closely spaced books which accumulate at a collecting station.

21 Claims, 6 Drawing Figures

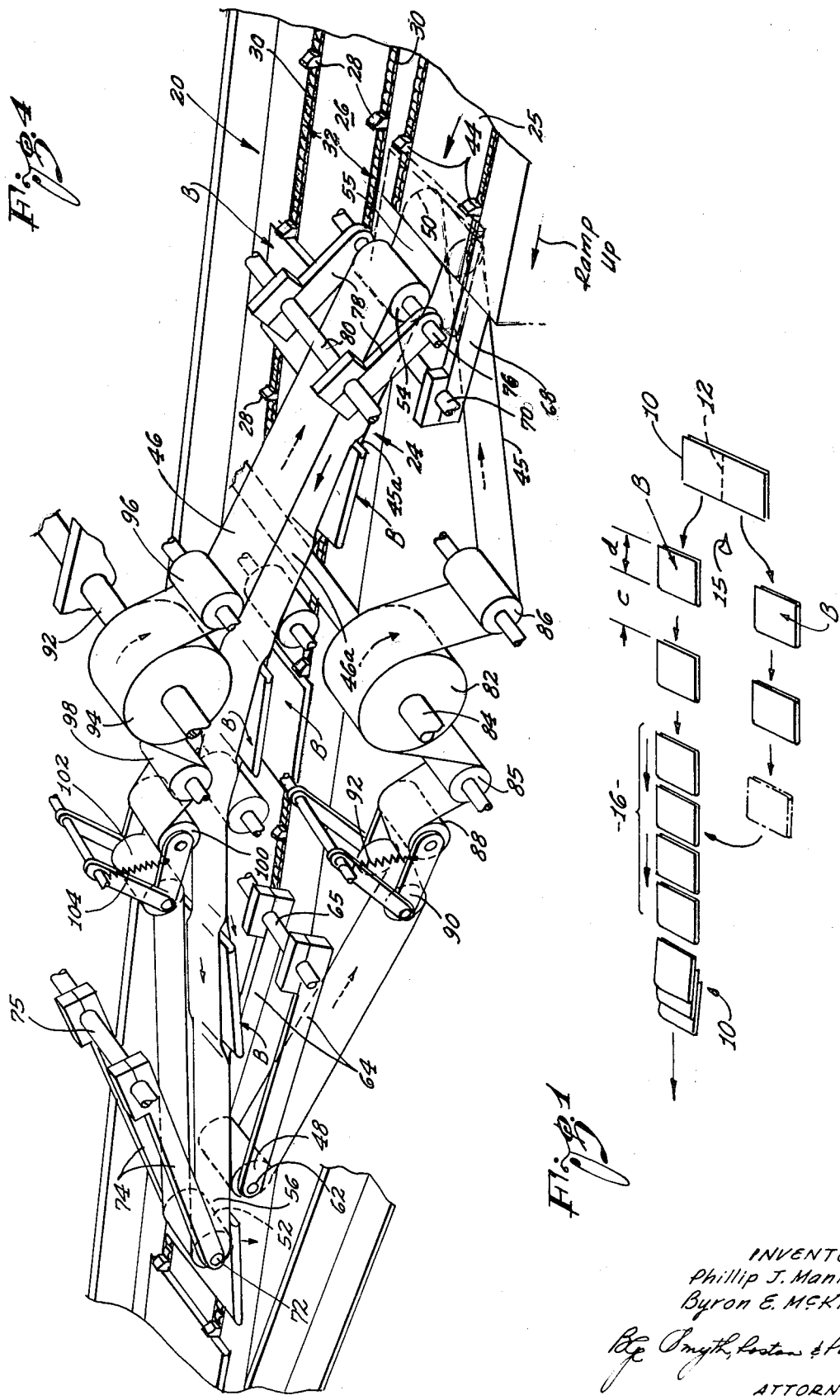

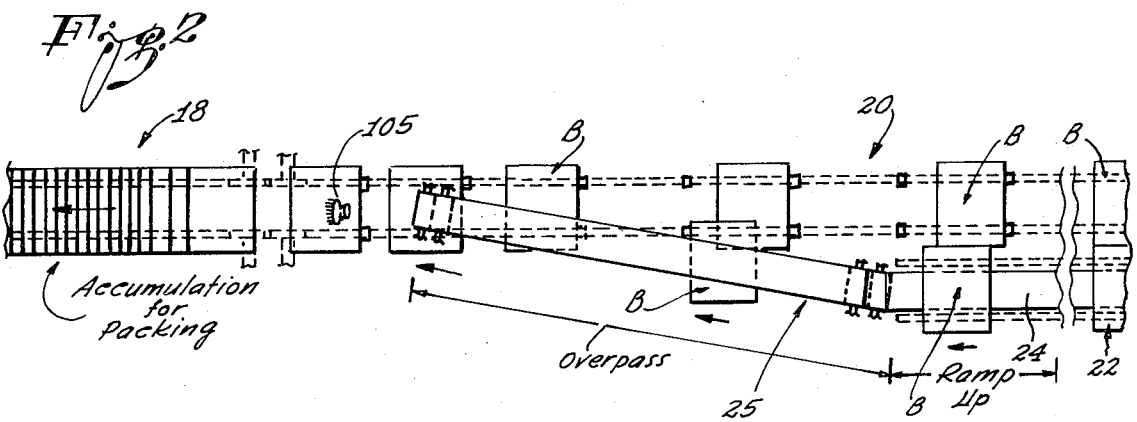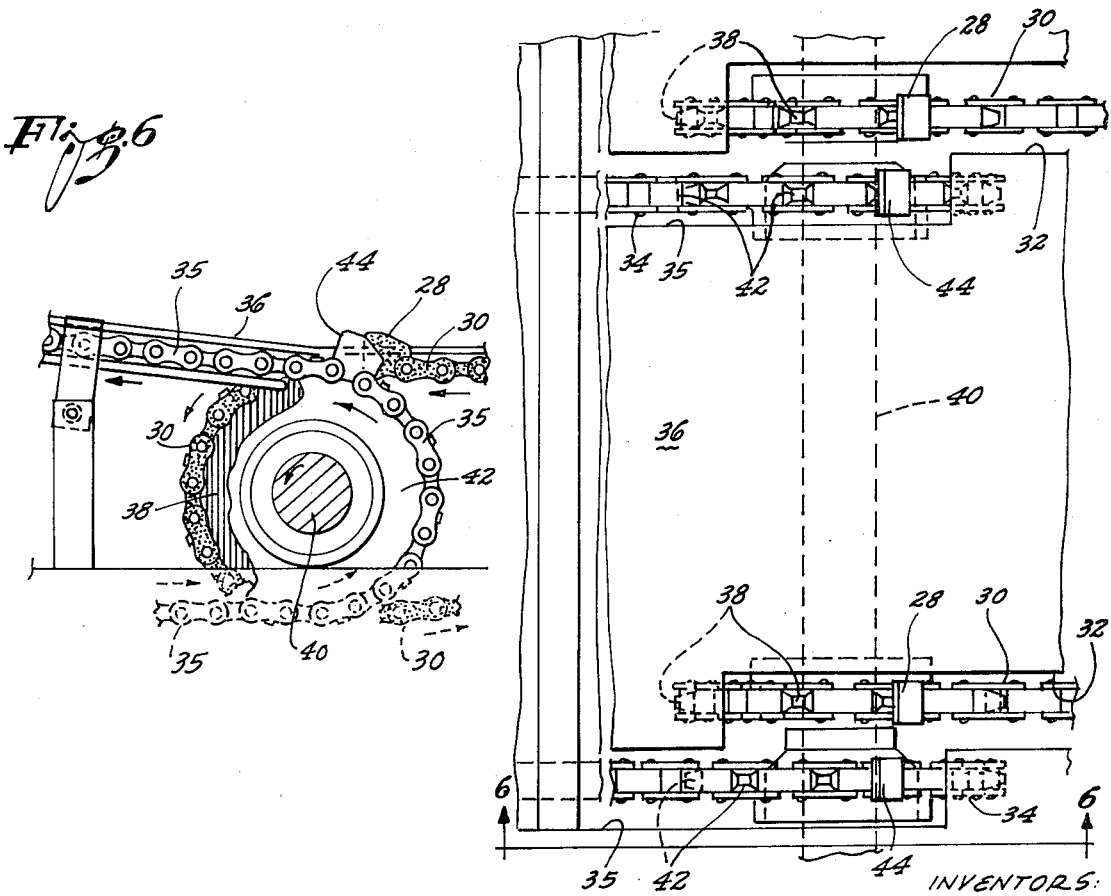

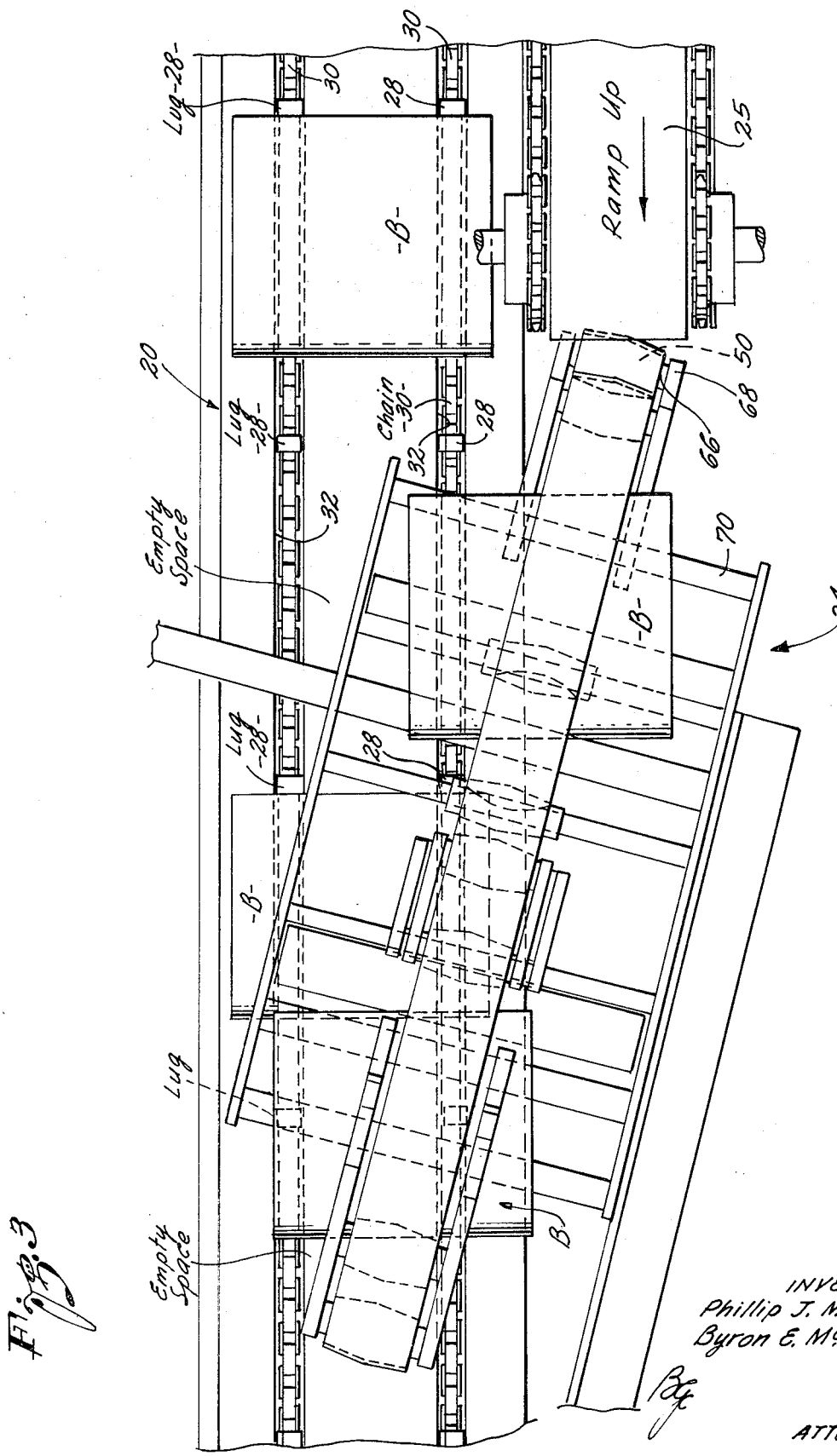

CONVEYOR SYSTEM

BACKGROUND OF THE INVENTION

The cost of printing and binding books such as catalogs and pamphlets is greatly reduced by first printing and binding the books in units that consist of two books integrally united edge to edge, and then bisecting the units. For further economy two of the units may be positioned face to face to be sheared simultaneously in one operation to produce a pair of books positioned face to face on each side of the shearing means.

For the purpose of collecting the finished books, two conveyors are commonly provided on the opposite sides, respectively, of the shearing station to provide two traveling rows of books.

SUMMARY OF THE INVENTION

The broad object of the invention is to convey the severed books from both sides of a shearing station to a single collecting station, thus eliminating one collecting station with corresponding reduction in the personnel required to collect and pack the books.

Broadly described, this object is attained first, by conveying the books in flat positions from one side of the shearing station to provide a traveling row of severed books with the books that are sheared on the successive shearing cycles separated by gaps on the conveyor, which gaps are longer than the dimensions of the flat books as measured in the direction of travel. Then the other books from the other side of the shearing station are deposited in the successive gaps to produce a combined row of closely spaced books which travels to a single collecting station.

It will be apparent to those skilled in the art that this broad concept may be carried out in various ways in various specific practices of the invention.

In the presently preferred practice of the invention, a first conveyor system and a second conveyor system extend on opposite sides respectively of a shearing station to receive the two series of severed books in flat positions. The first conveyor system consists solely of a chain conveyor having spaced pushers which push the books along smooth conveyor surfaces, the distance between the successive pushers being somewhat longer than the dimensions of the severed books as measured in the direction of travel. This chain conveyor extends all the way to a collection station.

The second conveyor system comprises three conveyors, namely, a second chain conveyor that receives books from the shearing station, a final belt conveyor which converges on the first chain conveyor and a short upwardly inclined chain conveyor which carries the severed books from the second chain conveyor to the receiving end of the belt conveyor. The initial chain conveyor of the second conveyor system that picks up books from the shearing station is of the same construction as the first mentioned chain conveyor that constitutes the first conveyor system.

The first and second chain conveyors that pick up books from opposite sides of the shearing station are synchronized with the shearing cycles that the severed books from the two sides of the shearing station drop onto the alternate spaces that are formed by the pushers on the two chain conveyors. Thus each of the two chain conveyors has a traveling row of books with the books that are sheared on successive cycles spaced apart on each chain conveyor by a distance greater than the dimension of the hooks in the direction of travel. Initially the spaced books on each chain conveyor are abreast the spaced books on the other chain conveyor.

The second conveyor system must be synchronized with the first chain conveyor to drop its books into the spaces between the books on the first chain conveyor and this synchronization may be accomplished by causing the two conveyor systems to carry the books at different overall rates of travel to the point at which the two conveyor systems merge. Thus the second conveyor system may be adjusted to gain on the first chain conveyor to achieve the desired synchronization at the point of merger, or, instead, the second conveyor system may lag relative to the first chain conveyor for the same purpose. It is also apparent that the required synchronization at the merger point of the two conveyor systems may be accomplished at least in part by arranging for both conveyor systems to travel at the same rate with one taking a longer path than the other conveyor system from the shearing station to the merger point of the two conveyor systems.

In the preferred practice of the invention, the books on the second conveyor system are clamped between two belts of the belt conveyor that drops the books onto the spaces on the first conveyor system and the two cooperating belts travel at a rate that exceeds the rate of travel of the first conveyor system. The short chain conveyor of the second conveyor system that lifts the books to the belt conveyor travels at a speed that is less than the speed of the belt conveyor but is greater than the rate of travel of the second chain conveyor. Thus the books that are carried by the second conveyor system are accelerated twice, first, by the short chain conveyor that feeds the belt conveyor and, second, by the belt conveyor. These two accelerations are sufficient to cause the books on the second conveyor system to gain on the books on the first chain conveyor, the gain being sufficient to cause the books from the second conveyor system to drop into the spaces between books on the first chain conveyor.

The features and advantages of the invention may be understood from the following detailed description and the accompanying drawings.

BRIEF DESCRIPTION OF THE DRAWINGS

FIG. 1 is a schematic view showing how units of two books each are bisected successively at a shearing station and further showing schematically how the severed books from the two opposite sides of the shearing station travel in parallel rows which merge in accord with the underlying concept of the invention;

FIG. 2 is a diagrammatic plan view of the first and second conveyor systems in the region where they merge;

FIG. 3 is an enlarged plan view of the first and second conveyor systems in the region where they merge, parts of the structure being omitted for clarity of illustration;

FIG. 4 is a diagrammatic perspective view of the two belts that are employed where the first and second conveyor systems merge;

FIG. 5 is an enlarged fragmentary plan view in the region of the juncture of two chain conveyors of the second conveyor system; and FIG. 6 is a simplified sectional view taken along the line 6—6 of FIG. 5.

DESCRIPTION OF THE PREFERRED PRACTICE OF THE INVENTION

FIG. 1 is a diagram illustrating the basic concept of the invention. In FIG. 1, a printed book unit 10, which is bound along its leading edge 12 comprises two printed books which are integral with each other in edge to edge relationship, the common edge being indicated by the dotted line 14. The units 10 are sheared by shearing means 15 at a shearing station to divide each unit into two books that fall respectively on opposite sides of the shearing station.

In this instance the shearing means 15 is capable of cutting through two book units 10 simultaneously with the two book units positioned face to face so that the two book units positioned face to face produce a pair of books positioned face to face on each side of the shearing means. As shown diagrammatically the paired sheared books on the two sides of the shearing station are conveyed away in two traveling rows, respectively. In FIG. 1 the paired sheared books which are designated B that are produced by the successive shearing cycles are spaced apart in each traveling row by a distance greater than the dimension of the books in the direction of their travel. Thus in FIG. 1 the length c of the space between two successive paired books is substantially greater than the dimension d of the paired books B.

With the paired books traveling abreast in the two rows the two rows merge, the books B of one traveling row being deposited in the spaces between the paired books in the other traveling row. Thus the initial two rows of paired books which are spaced relatively far apart merge to form a traveling combined row 16 of books that are spaced relatively close together. Finally the paired books of the traveling combined row are discharged at a terminal or collecting station where the books accumulate by crowding together in overlapping relationship as indicated at 18 to make it a simple matter for a workman to gather up successive stacks of the books for packing.

FIG. 2 shows portions of a first conveyor system 20 which is a chain conveyor and a second conveyor system which comprises a second chain conveyor 22, a belt conveyor 24, and a short upwardly inclined chain conveyor 25 which serves as a ramp to lift the books from the second chain conveyor to the receiving end of the belt conveyor.

Each of the first and second chain conveyors 20 and 22 is of the construction indicated in FIGS. 3 and 4. Each chain conveyor has a smooth support surface 26 along which the paired books B are pushed by pairs of lugs 28 that are incorporated in a pair of conveyor chains 30, the lugs traveling along a pair of longitudinal slots 32 in the support surface 26. The chains of the two chain conveyors travel at the same rate so that the paired books B on the two chain conveyors respectively travel abreast of each other until the paired books on the second chain conveyor 22 reach the receiving end of the short ramp chain conveyor 25.

FIG. 5 shows how the two conveyor chains 30 of the second chain conveyor 22 overlap corresponding conveyor chains 34 of the ramp chain conveyor 25 and, in like manner, shows how the longitudinal slots 32 in the support surface 26 of the second chain conveyor 22 overlap corresponding slots 35 in the support surface 36 of the short ramp conveyor 25.

In FIG. 5, the two sprocket chains 30 of the second chain conveyor 22 loop around corresponding drive sprockets 38 on a drive shaft 40, the drive shaft actuating sprocket chains of both of the chain conveyors 20 and 22. Rotatably mounted on the drive shaft 40 are spaced idler sprockets 42 at the receiving end of the ramp conveyor 25 and at the discharge end of the ramp conveyor the two conveyor chains 34 are looped around corresponding drive sprockets (not shown) on a corresponding drive shaft (not shown).

In the preferred embodiment of the invention the chains 30 of the first and second chain conveyors travel 12 inches on each rotation of a main drive shaft (not shown); the chains 34 of the ramp conveyor 25 travels 16 inches and the belt conveyor 24 travels 18 inches. Thus the pusher lugs of the ramp conveyor 25 travel 33⅓ percent faster than the pusher lugs 28 of the second chain conveyor 22. The spacing of the pusher lugs on the ramp conveyor, moreover, is 33⅓ percent greater than the spacing of the pusher lugs 28 on the second chain conveyor 22.

The pusher lugs on the ramp conveyor 25 are synchronized with the pusher lugs 28 of the second chain conveyor 22 to take over the pushing of the paired books B from the pusher lugs 28 just before the pusher lugs 28 turn downward over the drive sprockets 38 at the end of the second conveyor. FIG. 6 indicates how a pusher lug 44 of the ramp conveyor 25 has overtaken a pusher lug 28 of the second chain conveyor 22 to push a book pair B ahead of the pusher lug 28. If the book pair were not moved forward from the pusher lug 28 in this manner, the turning of the pusher lug 28 downward over the corresponding drive sprocket 38 would cause the book pairs to be pinched by the lug against the support surface 36 of the ramp chain conveyor.

Referring to FIGS. 3 and 4, the belt conveyor 24 comprises a lower belt 45 having an upper run 45a and an upper belt 46 having a lower run 46a, the two lower runs 45a and 46a being closely spaced in face-to-face relationship so that the two runs cooperate to clamp a book pair B to deliver the book pair to the first chain conveyor 20.

The lower belt 45 passes around a leading idler pulley 48 at the discharge end of the belt conveyor and passes around a similar trailing idler pulley 50 at the receiving end of the belt conveyor. In like manner the upper belt 46 passes around a leading idler pulley 52 at the discharge end of the belt conveyor and passes around a trailing idler pulley 54 at the receiving end of the belt conveyor.

It is to be noted that at the receiving end of the belt conveyor 24 the upper trailing idler pulley 54 is spaced forward from the lower trailing idler pulley 50 so that a portion 55 of the lower belt 45 serves as a moving platform to receive the book pairs B from ramp chain conveyor 25. The pusher lugs 44 of the ramp chain conveyor 25 continue to push the book pairs across the moving platform 55 until the book pairs are effectively gripped by the two belts. On the discharge end of the belt conveyor 24, the leading idler pulley 52 for the upper belt 46 is spaced forward from the leading idler pulley 48 of the lower belt 45. The book pairs carried by the belt conveyor are released as they pass beyond the leading idler pulley 48 of the lower belt 45 but a forward portion 56 of the upper belt 46 overhangs the released book pairs to insure that they are directed downward onto the first chain conveyor 20.

In the construction shown in FIGS. 3 and 4 the leading idler pulley 48 is mounted on a shaft 62 that is carried by a pair of parallel arms 64 that are mounted on an adjustable transverse rod 65; the trailing idler pulley 50 is mounted on a shaft 66 that is carried by a pair of parallel arms 68 with the pair of arms mounted on an adjustable transverse rod 70; the leasing idler pulley 52 is mounted on a shaft 72 with the shaft carried by a pair of arms 74 that are on an adjustable transverse rod 75; the trailing idler pulley 54 is mounted on a shaft 76 that is carried by a pair of arms 78, the arms 78 being mounted on an adjustable transverse rod 80.

The lower belt 45 is driven by a pulley 82 on a drive shaft 84 with two idler pulleys 85 and 86 straddling the drive pulley to hold the belt in effective contact therewith.

To keep the lower belt 45 under tension, the lower run of the belt passes over an idler pulley 88 and under an adjacent idler pulley 90 and, as indicated diagrammatically, suitable spring means 92 urges the idler pulley 88 upward against the resistance of the tension of the belt.

In like manner, the upper belt 46 is driven by a drive pulley 94 on a drive shaft 92 with two idler pulleys 96 and 98 positioned to maintain the belt in driving contact with the drive pulley. The upper run of the upper belt passes over an idler pulley 100 and under an idler pulley 102, here again, suitable spring means 104, shown diagrammatically, urges the idler pulley 100 upward relative to the idler pulley 102 against the resistance of the tension of the belt.

A feature of the invention is that although the belt conveyor changes the direction of travel of the books because it is at an acute angle to the direction of the second chain conveyor, nevertheless, it does not change the orientation of the books. When the belt conveyor picks up the books from the ramp conveyor the books are correctly oriented for alignment with the direction of travel of the first chain conveyor but are canted out of alignment with the belt conveyor. As may be seen in FIGS. 1, 2 and 3, the belt conveyor keeps the books canted relative to the belt conveyor to keep the books correctly oriented for the first chain conveyor on which the books are deposited.

Our description in specific detail of the presently preferred embodiment of the invention will suggest various changes substitutions and other departures from our disclosure within the spirit and scope of the appended claims.

We claim:

1. In a system for handling newly printed books wherein the books are printed and bound in units, each unit comprising two books integrally joined edge to edge and the units are conveyed to a shearing station where the units are bisected by shearing means to produce individual books, one book from each unit being deposited on each side of the shearing means,
   an apparatus to collect the sheared books, said apparatus comprising:
   a conveyor system to receive the books from one side of the shearing means with the books flat and with spaces between the books that are severed by the successive shearing operations, said spaces being longer than the dimension of the books as measured in the direction of their travel,
   said conveyor system terminating at a collection station; and
   means synchronized with the conveyor system to receive the other books from the other side of the shearing means and to deposit in said spaces successively said other books that are severed by the successive shearing operation, thereby producing on said conveyor system a traveling row of closely spaced books for accumulation at said collection station.

2. An apparatus as set forth in claim 1,
   in which said synchronized means is a second conveyor system;
   in which the two conveyor systems travel at the same rate past the shearing means so that books on the second conveyor system are spaced apart in the same manner as the books on the first conveyor system;
   and in which the rate of travel of one of the two conveyor systems changes relative to the rate of travel of the other conveyor system to cause the books on the second conveyor system to register with the spaces on the first conveyor system in the region of the terminal of the second conveyor system.

3. An apparatus as set forth in claim 2 in which the second conveyor system speeds up as it approaches its terminal.

4. An apparatus as set forth in claim 1 in which two units positioned face to face are bisected on each shearing operation to produce a pair of books positioned face to face on each side of the shearing means;
   in which the pairs of books received from the one side of the shearing means are spaced apart in flat positions on the conveyor system;
   and in which said synchronized means receives pairs of books from the other side of the shearing means and deposits the pairs in said spaces.

5. An apparatus as set forth in claim 1 in which said shearing means operates in shearing cycles to deposit the severed books on the conveyor system on each shearing cycle;
   and in which the rate of travel of the conveyor system is adjusted relative to the frequency of the shearing cycles to cause said spaces to be created on the conveyor system.

6. An apparatus as set forth in claim 1 in which said synchronized means is a second conveyor system, the two conveyor systems being on opposite sides of the shearing means to receive the books from the opposite sides of the shearing means respectively;
   in which the shearing means operates in cycles to deposit books on the two conveyor system on each shearing cycle;
   in which the rate of travel of the first conveyor system relative to the frequency of the shearing cycles is adjusted to create said spaces;
   in which the second conveyor system terminates at a point intermediate the length of the first conveyor system to deposit its books on the first conveyor system;

and in which the second conveyor system is synchronized with the first conveyor to deposit its books in said spaces.

7. An apparatus as set forth in claim 6 in which the second conveyor system terminates at a level above the first conveyor system to drop its books onto the first conveyor system.

8. An apparatus as set forth in claim 6 in which the terminal portion of the second conveyor system includes two synchronized belts overhanging the first conveyor system with runs of the two belts respectively traveling face-to-face to clamp the books between the two faces of the belts to lift the books above the level of the first conveyor system and to drop the books onto the first conveyor system.

9. An apparatus as set forth in claim 8 in which the second conveyor system includes a short upwardly inclined chain conveyor to feed the books to the pair of belts.

10. An apparatus as set forth in claim 9 in which the pair of belts travel faster than the remainder of the first conveyor system.

11. An apparatus as set forth in claim 10 in which said upwardly inclined chain conveyor travels faster than the preceding part of the first conveyor system but slower than the pair of belts, whereby the books on the second conveyor system are accelerated twice as they approach the terminal of the second conveyor system.

12. An apparatus as set forth in claim 8 in which at the receiving end of the pair of belts, the lower belt of the pair extends rearward of the upper belt to form a moving platform to receive the books.

13. An apparatus as set forth in claim 8 in which at the discharge end of the two belts the upper belt extends beyond the lower belt to overhang the books discharged by the pair of belts.

14. In a system for handling newly printed books wherein the books are printed and bound in units, each unit consisting of two integrally joined edge to edge and the units are subsequently bisected by cyclicly operating shearing means,
   an apparatus to collect the sheared books, comprising:
   a first conveyor to receive the sheared books from one side of the shearing means, said conveyor leading to a collection station;
   a second conveyor to receive the sheared books from the other side of the shearing means,
   each conveyor being synchronized with the shearing means to provide spaces on the conveyor between the books that are sheared on the successive shearing cycles, said spaces being longer than the dimensions of the books in their direction of travel; and
   a belt conveyor having a pair of belts with runs positioned face-to-face to grip the sheared books and to convey the sheared books from the second conveyor,
   said belt conveyor overhanging the first conveyor and being synchronized therewith to deliver its sheared books to the spaces on the first conveyor.

15. An apparatus as set forth in claim 14 in which at the receiving end of the belt conveyor, the lower belt of the pair of belts extends rearward of the upper belt to form a moving platform to receive the severed books.

16. An apparatus as set forth in claim 14 in which at the discharge end of the belt conveyor, the upper belt extends beyond the lower belt to overhang the books that are discharged by the pair of belts.

17. An apparatus as set forth in claim 14 which includes means to transfer the severed books from the second conveyor to the belt conveyor.

18. An apparatus as set forth in claim 14 in which the means to transfer the books comprises a short upwardly inclined chain conveyor.

19. An apparatus as set forth in claim 18 in which the short upwardly inclined chain conveyor travels faster than the second conveyor but slower than the belt conveyor.

20. An apparatus as set forth in claim 19
   in which the second conveyor has two parallel sprocket chains with pushers thereon;
   in which the short upwardly inclined chain conveyor has two parallel sprocket chains with pushers thereon;
   in which the chains of the second conveyor overlaps the chains of the short upwardly inclined chain conveyor;
   and in which the chains of the short upwardly inclined chain conveyor travel faster than the chains of the second conveyor with the pushers on the short upwardly chain conveyor synchronized with the pushers of the second conveyor to overtake the pushers on the second chain conveyor to push the severed books forward away from the pushers of the second conveyor as the pushers of the second chain conveyor approach the ends of their forward runs.

21. An apparatus as set forth in claim 14
   in which the first and second conveyors are parallel;
   in which the belt conveyor is at an acute angle to the first and second conveyors;
   and in which the belt conveyor grips the books and transports the books without changing the orientation of the books.

* * * * *